(12) United States Patent
Mann

(10) Patent No.: US 10,857,628 B2
(45) Date of Patent: Dec. 8, 2020

(54) INTERLAYERED STRUCTURES FOR JOINING DISSIMILAR MATERIALS AND METHODS FOR JOINING DISSIMILAR METALS

(71) Applicant: The Boeing Company, Chicago, IL (US)

(72) Inventor: Austin E. Mann, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 168 days.

(21) Appl. No.: 15/804,061

(22) Filed: Nov. 6, 2017

(65) Prior Publication Data

US 2019/0134756 A1 May 9, 2019

(51) Int. Cl.
*B23K 20/12* (2006.01)
*B23K 35/22* (2006.01)
(Continued)

(52) U.S. Cl.
CPC ............ *B23K 35/005* (2013.01); *B23K 20/12* (2013.01); *B23K 20/1205* (2013.01);
(Continued)

(58) Field of Classification Search
None
See application file for complete search history.

(56) References Cited

U.S. PATENT DOCUMENTS 3,125,805 A * 3/1964 Horigan ............... B23K 20/227
228/199
4,674,675 A 6/1987 Mietrach
(Continued)

FOREIGN PATENT DOCUMENTS

| CN | 107127454 A | * 9/2017 |
|---|---|---|
| JP | S56-74390 | 6/1981 |
| JP | H01-241375 | 9/1989 |

OTHER PUBLICATIONS

European Patent Office, "Communication pursuant to Article 94(3) EPC," with translation of document JP-H01241375-A, App. No. 18 194 464.6 dated (Apr. 23, 2019).
(Continued)

*Primary Examiner* — Devang R Patel
(74) *Attorney, Agent, or Firm* — Walters & Wasylyna LLC

(57) ABSTRACT

An interlayered structure for joining of dissimilar materials includes: a first material substrate; a second material substrate having a composition dissimilar from a composition of the first material substrate; and a plurality of interlayers disposed between the first material substrate and the second material substrate, including a first interlayer nearest to the first material substrate and a last interlayer nearest to the second material substrate. The first interlayer has a composition selected to have a maximum solid solubility within the composition of the first material substrate that is greater than or equal to the other interlayers within the composition of the first material substrate, and the last interlayer has a composition selected to have a maximum solid solubility within the composition of the second material substrate that is greater than or equal to the other interlayers within the composition of the second material substrate.

25 Claims, 15 Drawing Sheets

(51) Int. Cl.
| | |
|---|---|
| *B23K 35/00* | (2006.01) |
| *B23K 20/227* | (2006.01) |
| *B23K 20/24* | (2006.01) |
| *B23K 20/16* | (2006.01) |
| *B32B 15/01* | (2006.01) |
| *B23K 103/24* | (2006.01) |
| *B23K 101/18* | (2006.01) |

(52) U.S. Cl.
CPC ............ *B23K 20/129* (2013.01); *B23K 20/16* (2013.01); *B23K 20/227* (2013.01); *B23K 20/24* (2013.01); *B23K 35/004* (2013.01); *B32B 15/013* (2013.01); *B23K 2101/18* (2018.08); *B23K 2103/24* (2018.08)

(56) References Cited

U.S. PATENT DOCUMENTS

| | | | | |
|---|---|---|---|---|
| 6,875,949 | B2 * | 4/2005 | Hall | B23K 35/3053 |
| | | | | 219/121.64 |
| 8,025,983 | B2 * | 9/2011 | Lee | B23K 20/023 |
| | | | | 428/660 |

OTHER PUBLICATIONS

European Patent Office, "Communication," App. No. 18194464.6 dated (Apr. 8, 2019).

Patent abstract of JP H01-241375.

Patent abstract of JP S56-74390.

Wei et al., "Fabrication and characterization of a functionally graded material from Ti-6Al-4V to SS316 by laser metal deposition," *Additive Manufacturing*, vol. 14, pp. 95-104 (2017).

Pardal et al., "Dissimilar metal joining of stainless steel and titanium using copper as transition metal," *Int. J. Adv. Manuf. Technol.*, vol. 86, pp. 1139-1150 (2016).

Shiue et al., "Infrared Brazing of Ti-6Al-4V and 17-4 PH Stainless Steel with a Nickel Barrier Layer," *Metallurgical and Materials Transactions A*, vol. 37A (2006).

European Patent Office, "Communication pursuant to Article 94(3) EPC," App. No. 18 194 464.6 (dated Nov. 22, 2019).

European Patent Office, "Communication pursuant to Article 94(3) EPC," App. No. 18 194 464.6 (dated Jul. 24, 2020).

\* cited by examiner

INTERLAYERED STRUCTURES FOR JOINING DISSIMILAR MATERIALS AND METHODS FOR JOINING DISSIMILAR METALS

FIELD

The present description relates to the field of joining dissimilar materials, in particular joining titanium-based components with iron-based components by friction welding.

BACKGROUND

There has been increased interest in joining dissimilar materials to produce compositionally graded structures. However, joining dissimilar materials involves many challenges, including metallurgical incompatibility between the dissimilar materials.

Titanium-based alloys are often considered for use because of their excellent mechanical and metallurgical properties, and there has been increased interest in joining titanium-based alloys with dissimilar materials, such as stainless steels, which have excellent weldability and are more inexpensive than titanium-based alloys. Traditionally, titanium-based alloys and iron-based alloys (e.g. steels) are difficult to join. Most joining and welding techniques involve some kind of thermal input to create the energy necessary for a proper bond. However, this energy input enables the formation of deleterious phases that significantly hinder the stability and strength of the interface between the two dissimilar metals. This makes it a challenge to design airframe structures that take advantage of both the titanium and steel systems, while meeting design criteria for the joint.

Accordingly, those skilled in the art continue with research and development in the field of joining dissimilar materials, in particular joining titanium-based components with iron-based components.

SUMMARY

In one embodiment, an interlayered structure for joining of dissimilar materials includes: a first material substrate; a second material substrate having a composition dissimilar from a composition of the first material substrate; and a plurality of interlayers disposed between the first material substrate and the second material substrate, including a first interlayer nearest to the first material substrate and a last interlayer nearest to the second material substrate. The first interlayer has a composition selected to have a maximum solid solubility within the composition of the first material substrate that is greater than or equal to the other interlayers within the composition of the first material substrate, and the last interlayer has a composition selected to have a maximum solid solubility within the composition of the second material substrate that is greater than or equal to the other interlayers within the composition of the second material substrate.

In another embodiment, an interlayered structure for joining of titanium-based components with iron-based components includes: a first metal substrate comprising titanium; a second metal substrate comprising iron; a first interlayer disposed between the first metal substrate and the second metal substrate, the first interlayer comprising at least one of molybdenum and vanadium; and a second interlayer disposed between the first interlayer and the second metal substrate, the second interlayer comprising at least one of chromium and nickel.

In yet another embodiment, a method for joining dissimilar metals includes: providing an interlayered structure, comprising: a first metal substrate; a second metal substrate having a composition dissimilar from a composition of the first metal substrate; and a plurality of interlayers disposed between the first metal substrate and the second metal substrate, including a first interlayer nearest to the first metal substrate and a last interlayer nearest to the second metal substrate, wherein the first interlayer has a composition selected to have a maximum solid solubility within the composition of the first material substrate that is greater than or equal to the other interlayers within the composition of the first material substrate, and wherein the last interlayer has a composition selected to have a maximum solid solubility within the composition of the second material substrate that is greater than or equal to the other interlayers within the composition of the second material substrate; and joining the first metal substrate and a second metal substrate by heat of friction derived from relative movement between the first metal substrate and the second metal substrate.

Other embodiments of the disclosed interlayered structures for joining dissimilar materials and methods for joining dissimilar metals will become apparent from the following detailed description, the accompanying drawings and the appended claims.

DETAILED DESCRIPTION

Figure 1:
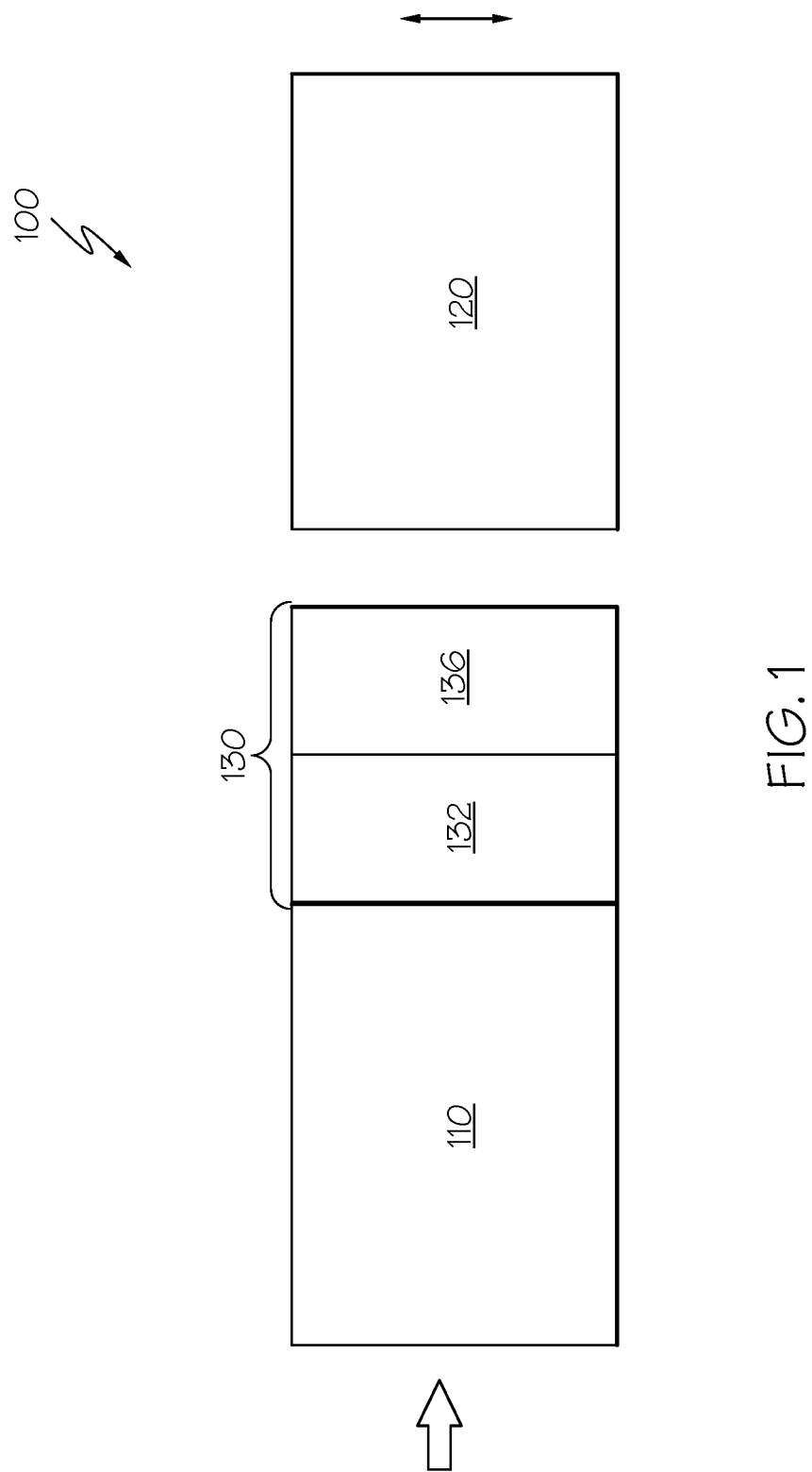
FIG. 1 is a side view of an exemplary interlayered structure for joining dissimilar materials according to an embodiment of the present description.

FIG. 1 illustrates an exemplary interlayered structure 100 for joining dissimilar materials, including a first material substrate 110, a second material substrate 120 having a composition dissimilar from a composition of the first material substrate, and a plurality of interlayers 130 disposed between the first material substrate and the second material substrate. The plurality of interlayers includes a first interlayer 132 nearest to the first material substrate, and a last interlayer 136 nearest to the second material substrate.

Figure 2:
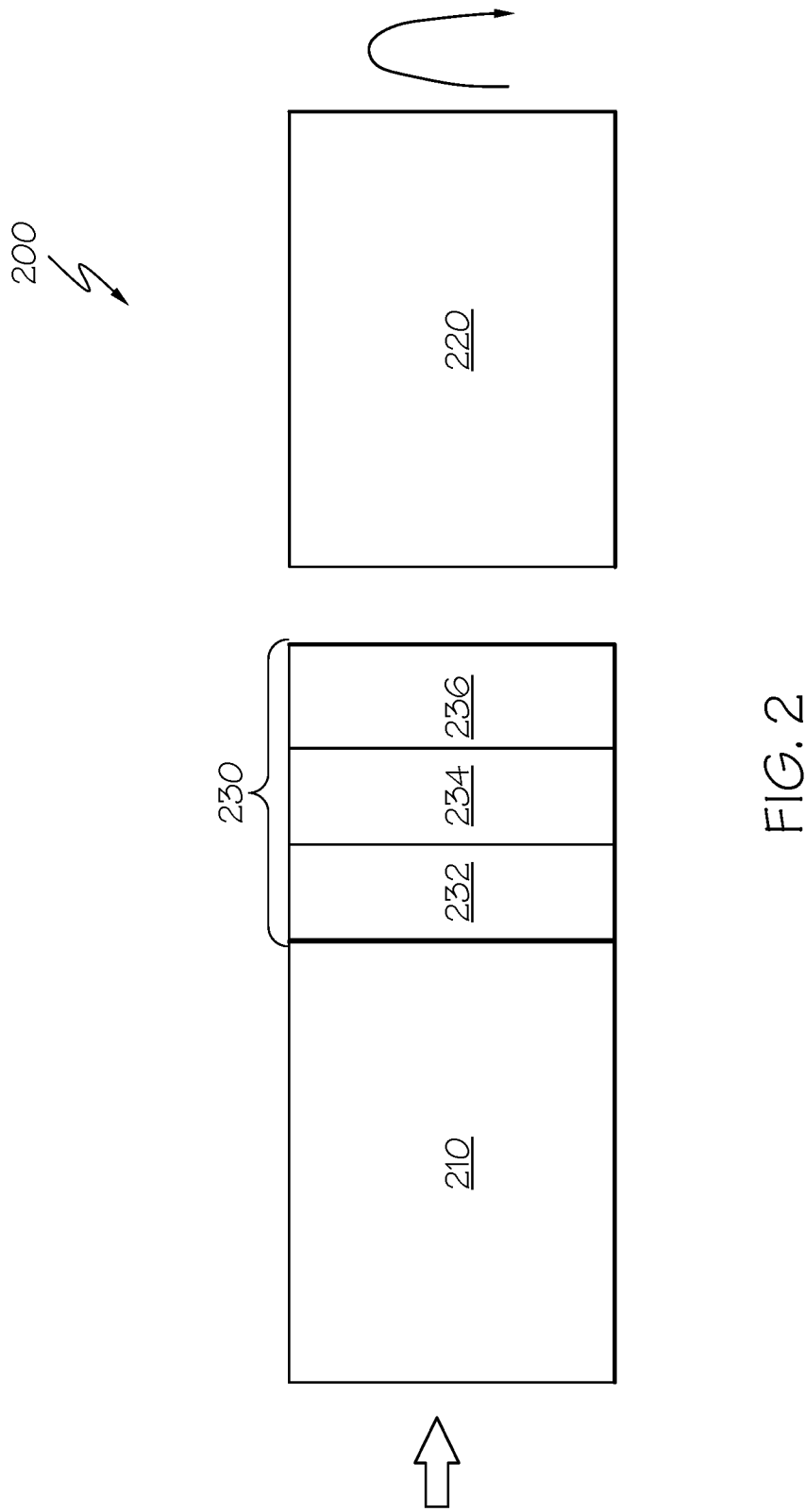
FIG. 2 is a side view of another exemplary interlayered structure for joining dissimilar materials according to an embodiment of the present description.

FIG. 2 illustrates another exemplary interlayered structure 200 for joining dissimilar materials, including a first material substrate 210, a second material substrate 220 having a composition dissimilar from a composition of the first material substrate, and a plurality of interlayers 230 disposed between the first material substrate and the second material substrate. The plurality of interlayers includes a first interlayer 232 nearest to the first material substrate, a last interlayer 236 nearest to the second material substrate, and a second interlayer 234 between the first interlayer and the last interlayer. In another example, the plurality of interlayers may include a third interlayer between the second interlayer and the last interlayer. In yet another example, the plurality of interlayers may include a fourth interlayer between the third interlayer and the last interlayer, etc.

In the examples shown in FIGS. 1 and 2, the plurality of interlayers have been illustrated as being deposited on the first material substrate. In another example, the plurality of interlayers may be deposited on the second material substrate. In yet another example, one or more of the plurality of interlayers may be deposited on the first material substrate, and a remaining of the plurality of interlayers may be deposited on the second material substrate.

In the present description, the interlayers facilitate joining the first material substrate and the second material substrate by friction welding, not to be confused with friction stir welding.

Friction welding is a known joining process that generates heat through mechanical friction between workpieces in relative motion (e.g. linear oscillation as shown in FIG. 1 or rotational as shown in FIG. 2) to one another, with the addition of a lateral force (as shown in FIGS. 1 and 2) to displace and fuse the workpieces. In contrast to friction welding, friction stir welding utilizes an external pin tool to perform the mechanical mixing of materials. Therefore, it is less feasible that the interlayered structure of the present description would be utilized in friction stir welding.

An advantage of friction welding is that it allows dissimilar materials to be joined. However, direct friction welding of dissimilar materials still results in the formation of deleterious phases that significantly hinder the stability and strength of the interface between the two dissimilar metals. Accordingly, the present description positions a plurality of interlayers between the first material substrate and the second material substrate.

Figure 3:
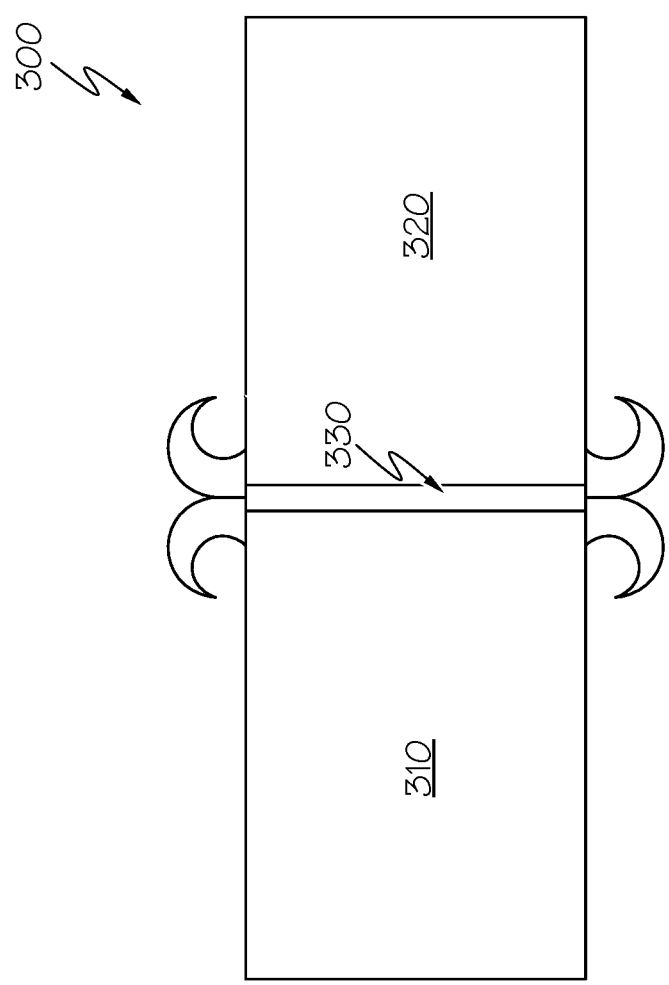
FIG. 3 is a side view of an exemplary joined structure after joining the exemplary interlayered structure of FIG. 1 or FIG. 2.

FIG. 3 illustrates a joined structure after friction welding of an interlayer structure of the present description. As shown, the joined structure 300 includes a first material substrate 310 corresponding to first material substrate 110 or 210 and a second material substrate 320 corresponding to second material substrate 120 or 220. During friction welding, an amount of material will be forced out as flash, and an amount of the plurality of interlayers 130, 230 will remain in the joined structure as an intermixed remnant interlayer 330. Thus, the interlayers provide a sacrificial layer that is consumed during friction welding of the first material substrate and the second material substrate. The friction welding may yield an intermixed remnant layer after flash ejection of at least 0.0001 inch, such as at least 0.001 inch disposed between the first material substrate and the second material substrate.

In the present description, the compositions of the plurality of interlayers are selected to prevent or minimize the formation of deleterious phases at the interface between the two dissimilar metals.

In one aspect, the first interlayer 132, 232 has a composition selected to have a maximum solid solubility within the composition of the first material substrate 110, 210 that is greater than or equal to the other interlayers within the composition of the first material substrate 110, 210, and wherein the last interlayer 136, 236 has a composition selected to have a maximum solid solubility within the composition of the second material substrate 120, 220 that is greater than or equal to the other interlayers within the composition of the second material substrate 120 220.

In another aspect, the first interlayer 132, 232 has a composition selected to have a maximum solid solubility within the composition of the first material substrate 110, 210 that is greater than the last interlayer 136, 236 within the composition of the first material substrate 110, 210, and wherein the last interlayer 136, 236 has a composition selected to have a maximum solid solubility within the composition of the second material substrate 120, 220 that is greater than the first interlayer 132, 232 within the composition of the second material substrate 120, 220.

In another aspect, the plurality of interlayers includes a second interlayer 134 between the first interlayer 132 and the last interlayer 136, wherein the second interlayer 134 has a composition selected to have a maximum solid solubility within the composition of the first material substrate 110 that is greater than the last interlayer 136 within the composition of the first material substrate 110 and to have a maximum solid solubility within the composition of the second material substrate 120 that is greater than the first interlayer 132 within the composition of the second material substrate 120.

By way of selecting the compositions of the plurality of interlayers, the maximum solid solubilities of the interlayers within the first material substrate and within the second material substrate may be controlled to prevent or minimize the formation of deleterious phases at the interface between the first material substrate and the second material substrate.

In the present description, the term "maximum solid solubility" refers to the highest (by atomic percent basis) equilibrium solid solubility of the solid solute component within the respective solid solvent component at any temperature from room temperature to the melting temperature. For example, if a solid solute component is completely soluble at equilibrium within the respective solid solvent component at an elevated temperature, then the maximum solid solubility would be 100%. If a solid solute component is soluble up to 15 atomic percent within the respective solid solvent component at an elevated temperature but only up to 5 atomic percent within the respective solid solvent component at room temperature, then the maximum solid solubility would be 15%.

In the present description, the dimensions of the first material substrate and the second material substrate, such as length, width, and height, are not dependent on the dimensions of the interlayers, and are not dependent on the upset distance, which is an independent process control variable.

In the present description, the thicknesses of the interlayers are selected to prevent or minimize the formation of deleterious phases at the interface between the two dissimilar metals.

Returning to FIG. 3, during friction welding, an amount of material will be forced out as flash, the amount of which corresponds to an upset distance between the first material substrate and the second material substrate. In addition to accounting for the upset distance, diffusion of materials occurs at a small distance across the interface due to heat generated from mechanical friction between the first material substrate and the second material substrate.

Thus, a total thickness of the plurality of interlayers is selected to be greater than the upset distance between the first material substrate and the second material substrate plus a width of the diffusion zone of materials across the interface between the first material substrate and the second material substrate. The upset distance is determined as a parameter of the friction welding process, and the width of the diffusion zone may be determined by empirical measurement of a diffusion zone of prior experimental results. In consideration of these factors, the plurality of interlayers may have a total thickness of at least 0.01 inch, such as at least 0.5 inch.

However, it is undesirable to further increase the total thickness of the plurality of interlayers beyond that which is necessary to prevent or minimize the formation of deleterious phases. Accordingly, in an aspect, the plurality of interlayers may have a total thickness of at most 1.0 inch, such as at most 0.5 inch.

Furthermore, the plurality of interlayers may intermix with each other during friction welding. Therefore, each of the interlayers may have a thickness of at least 0.001 inch, such as at least 0.01 inch. Also, compositions of the non-adjacent interlayers may be selected to prevent or minimize the formation of deleterious phases as a result of such intermixing.

The plurality of interlayers may be deposited onto the first material substrate and/or the second material substrate by any suitable method, including, for example, thermal spray processes and additive manufacturing processes.

In the following embodiments of the present description, an interlayered structure for joining titanium-based components with iron-based components includes: a first metal substrate comprising titanium; a second metal substrate comprising iron; a first interlayer disposed between the first metal substrate and the second metal substrate, the first interlayer comprising at least one of molybdenum and vanadium; and a second interlayer disposed between the first interlayer and the second metal substrate, the second interlayer comprising at least one of chromium and nickel.

In an aspect, the first metal substrate comprises a titanium-based alloy. In another aspect, the second metal substrate comprises an iron-based alloy, such as steel, in particular stainless steel.

In an aspect, the first interlayer comprises molybdenum. For example, the first interlayer consists of molybdenum and up to 5% of other elements.

In another aspect, the first interlayer comprises vanadium. For example, the first interlayer consists of vanadium and up to 5% of other elements.

In yet another aspect, the first interlayer comprises molybdenum and vanadium. For example, the first interlayer consists of molybdenum, vanadium and up to 5% of other elements.

Figure 4:
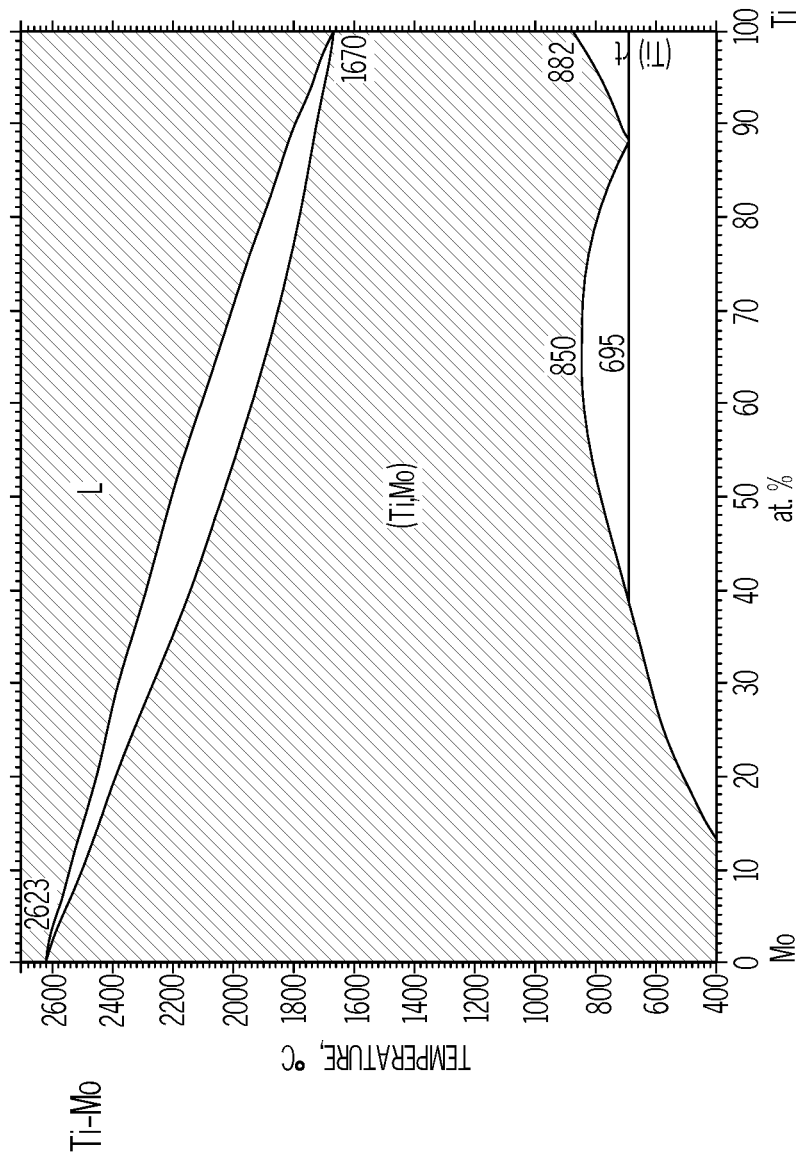
FIG. 4 is a binary phase diagram of the titanium-molybdenum system.
Figure 5:
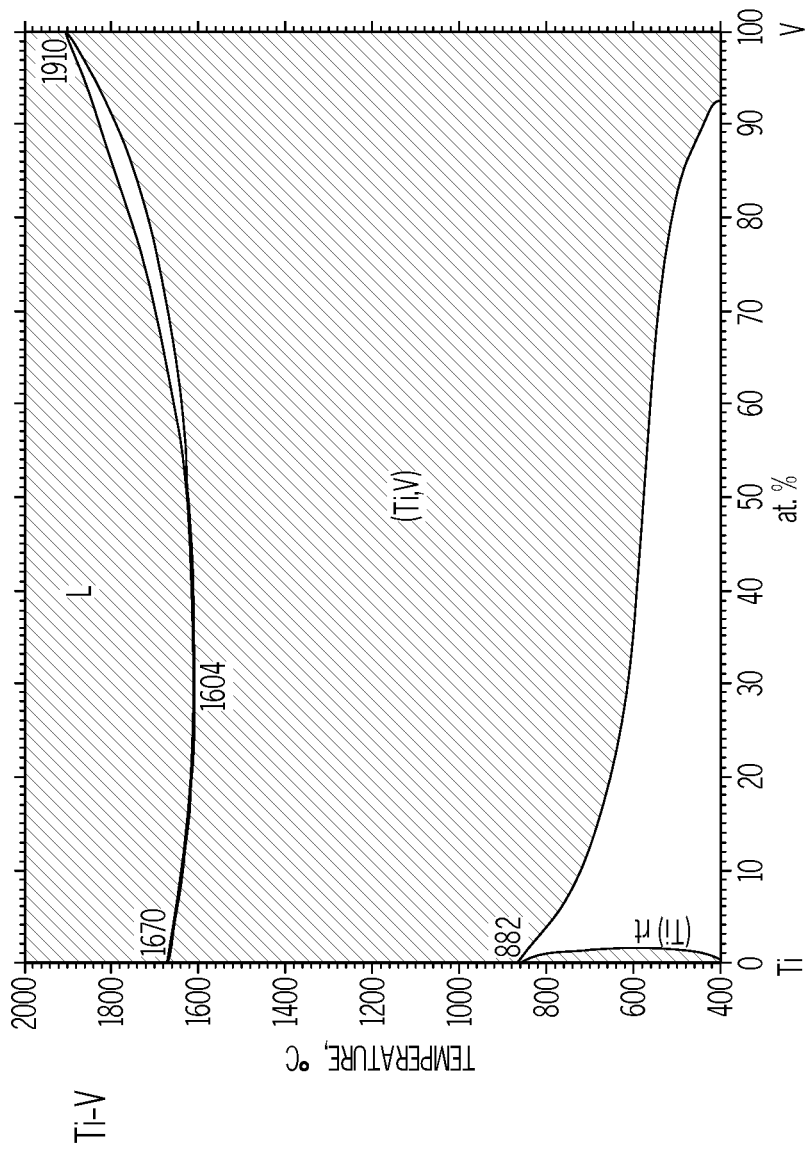
FIG. 5 is a binary phase diagram of the titanium-vanadium system.

FIG. 4 is the titanium-molybdenum binary phase diagram, showing complete (i.e. 100%) solid solubility of molybdenum in titanium at elevated temperatures. FIG. 5 is the titanium-vanadium binary phase diagram, showing complete (i.e. 100%) solid solubility of vanadium in titanium at elevated temperatures.

By way of selecting the first interlayer to comprise molybdenum and/or vanadium, the formation of deleterious phases at the interface between the first metal substrate comprising titanium and the first interlayer can be prevented or minimized.

In an aspect, the second interlayer comprises chromium. For example, the second interlayer consists of chromium and up to 5% of other elements.

In another aspect, the second interlayer comprises nickel. For example, the second interlayer consists of nickel and up to 5% of other elements.

In yet another aspect, the second interlayer comprises chromium and nickel. For example, the second interlayer consists of chromium, nickel and up to 5% of other elements.

Figure 6:
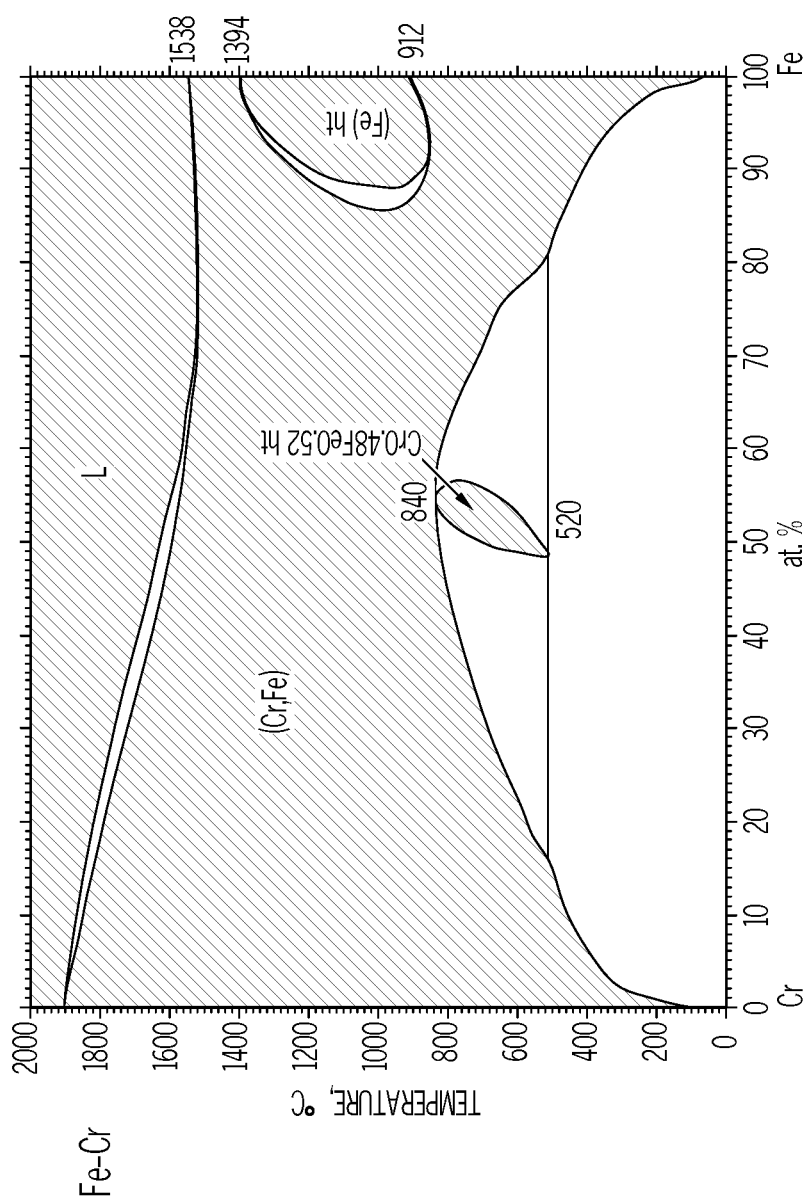
FIG. 6 is a binary phase diagram of the iron-chromium system.
Figure 7:
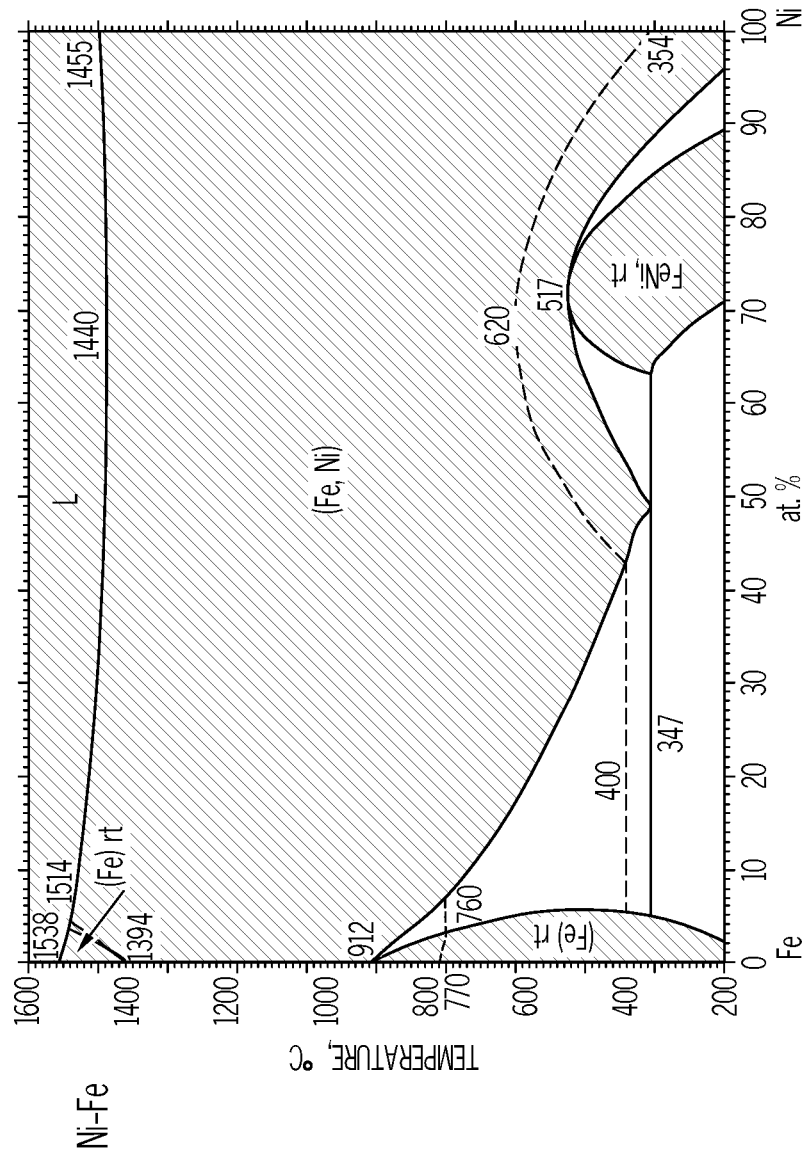
FIG. 7 is a binary phase diagram of the nickel-iron system.

FIG. 6 is the iron-chromium binary phase diagram, showing complete (i.e. 100%) solid solubility of chromium in iron at elevated temperatures. FIG. 7 is the nickel-iron binary phase diagram, showing complete (i.e. 100%) solid solubility of nickel in iron at elevated temperatures.

By way of selecting the second interlayer to comprise chromium and/or nickel, the formation of deleterious phases at the interface between the second metal substrate comprising iron and the second interlayer can be prevented or minimized.

In an aspect, the first interlayer has a thickness of at least 0.001 inch, such as at least 0.01 inch. In another aspect, the second interlayer has a thickness of at least 0.001 inch, such as at least 0.01 inch.

In an aspect, the first interlayer and the second interlayer may be deposited on the first metal substrate. The first interlayer may be deposited directly on the first metal substrate, and the second interlayer may be deposited directly on the first interlayer.

In another aspect, the first interlayer and the second interlayer may be deposited on the second metal substrate. The second interlayer may be deposited directly on the second metal substrate, and the first interlayer may be deposited directly on the second interlayer.

Figure 8:
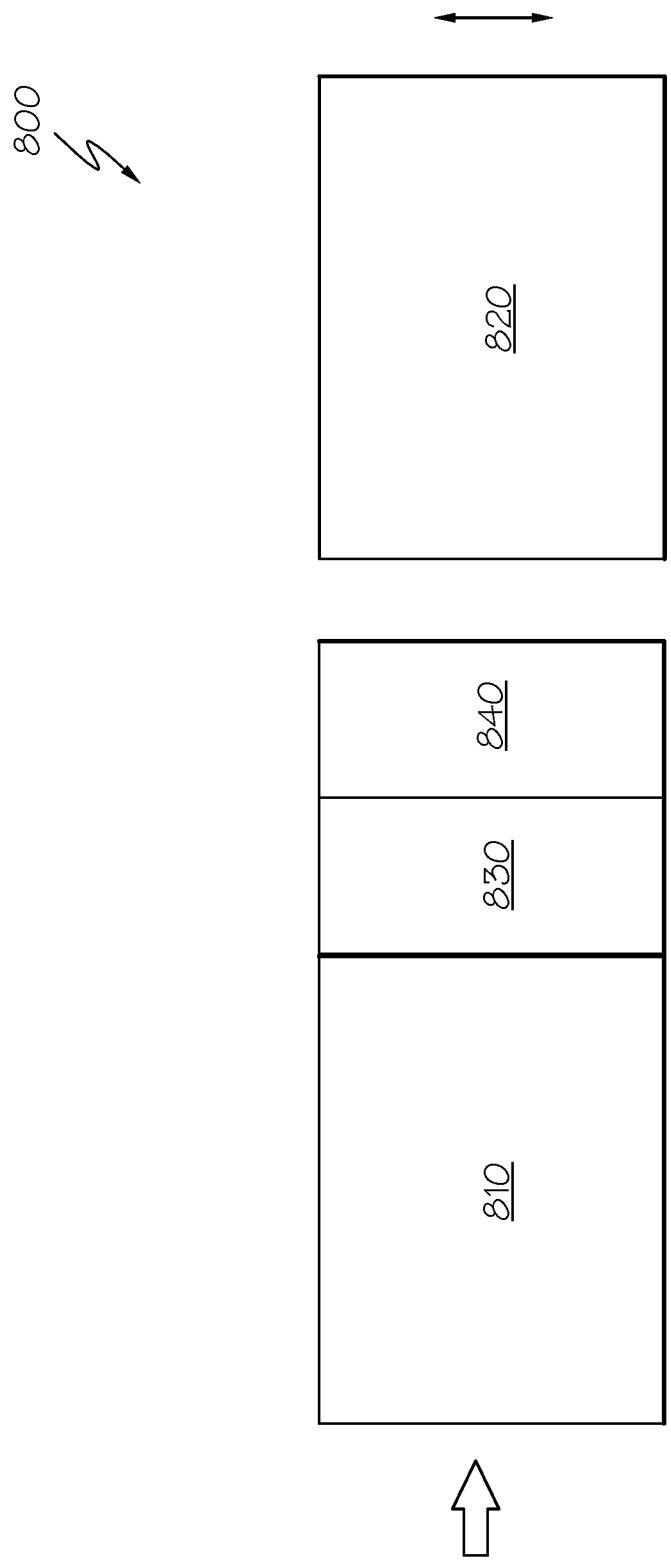
FIG. 8 is a side view of an exemplary interlayered structure for joining titanium-based components with iron-based components according to an embodiment of the present description.

FIG. 8 illustrates an exemplary interlayered structure 800 for joining titanium-based components with iron-based components. The interlayered structure 800 includes: a first metal substrate 810 comprising a titanium-based alloy; a second metal substrate 820 comprising an iron-based alloy; a first interlayer 830 disposed between the first metal substrate and the second metal substrate, the first interlayer comprising molybdenum; and a second interlayer 840 disposed between the first interlayer and the second metal substrate, the second interlayer comprising chromium. By way of selecting the first interlayer to comprise molybdenum and the second interlayer to comprise chromium, the formation of deleterious phases at the interface between the first metal substrate and the second metal substrate can be prevented or minimized. In this exemplary embodiment, the first interlayer comprises molybdenum and is deposited directly on the titanium of the first metal substrate, and the second interlayer comprises chromium and is deposited directly on the first interlayer that comprises molybdenum. The first interlayer has a selected composition comprising molybdenum, which has a maximum solid solubility within the first material substrate comprising the titanium-based alloy that is greater than or equal to the solubility of the other interlayer (comprising chromium) within the first material substrate comprising the titanium-based alloy. Likewise, the second interlayer (or last interlayer) has a selected composition comprising chromium, which has a maximum solid solubility within the composition of the second material substrate comprising the iron-based alloy that is greater than or equal to the solubility of the other interlayer (comprising molybdenum) within the second material substrate comprising the iron-based alloy. Although the first interlayer and the second interlayer are shown as being deposited on the first metal substrate, the first interlayer and the second interlayer may alternatively be deposited on the second metal substrate, or the first interlayer may be deposited on the first metal substrate and the second interlayer may be deposited in the second metal substrate.

Figure 9:
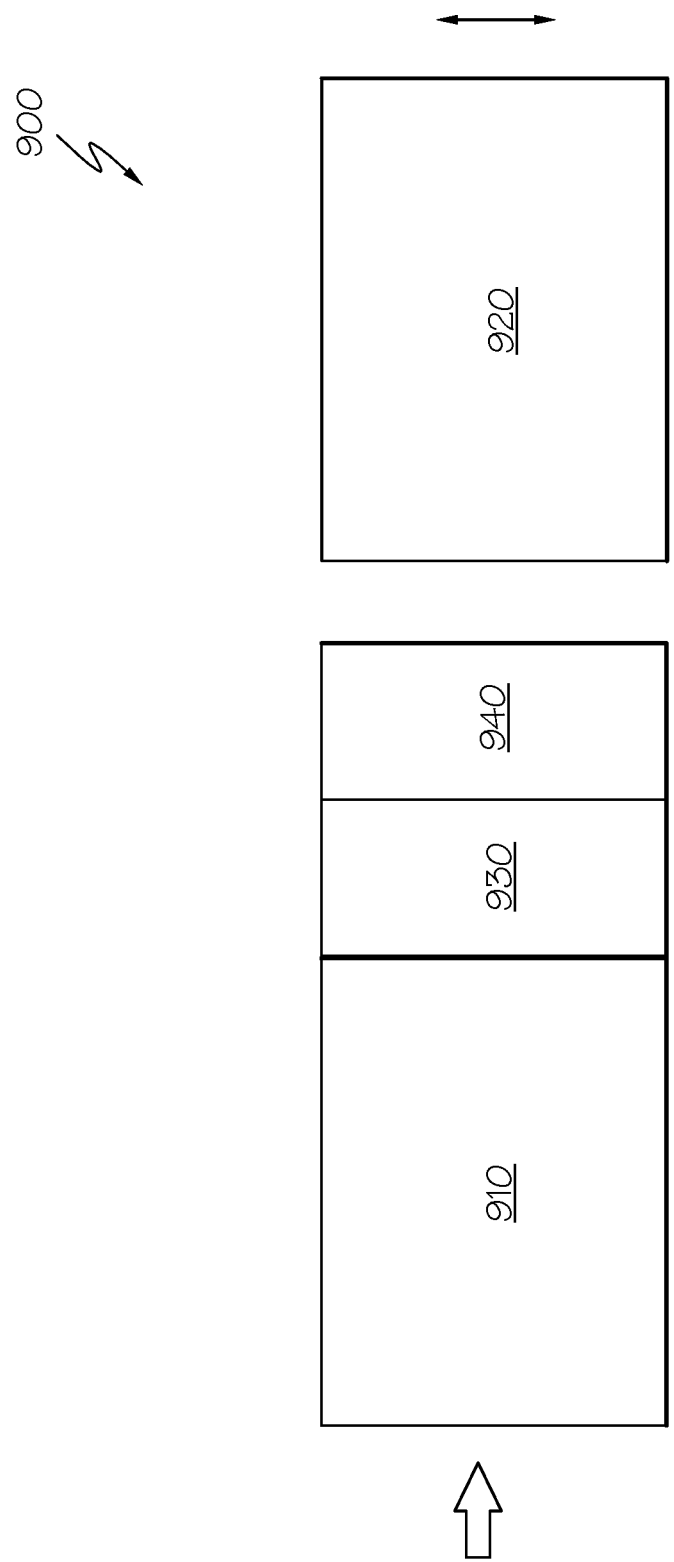
FIG. 9 is a side view of another exemplary interlayered structure for joining titanium-based components with iron-based components according to an embodiment of the present description.

FIG. 9 illustrates an exemplary interlayered structure 900 for joining titanium-based components with iron-based components. The interlayered structure 900 includes: a first metal substrate 910 comprising a titanium-based alloy; a second metal substrate 920 comprising an iron-based alloy; a first interlayer 930 disposed between the first metal substrate and the second metal substrate, the first interlayer comprising vanadium; and a second interlayer 940 disposed between the first interlayer and the second metal substrate, the second interlayer comprising chromium. By way of selecting the first interlayer to comprise vanadium and the second interlayer to comprise chromium, the formation of deleterious phases at the interface between the first metal substrate and the second metal substrate can be prevented or minimized. In this exemplary embodiment, the first interlayer comprises vanadium and is deposited directly on the titanium of the first metal substrate, and the second interlayer comprises chromium and is deposited directly on the first interlayer that comprises vanadium. The first interlayer has a selected composition comprising vanadium, which has a maximum solid solubility within the first material substrate comprising the titanium-based alloy that is greater than or equal to the solubility of the other interlayer (comprising chromium) within the first material substrate comprising the titanium-based alloy. Likewise, the second interlayer (or last interlayer) has a selected composition comprising chromium, which has a maximum solid solubility within the composition of the second material substrate comprising the iron-based alloy that is greater than or equal to the solubility of the other interlayer (comprising vanadium) within the second material substrate comprising an iron-based alloy. Although the first interlayer and the second interlayer are shown as being deposited on the first metal substrate, the first interlayer and the second interlayer may alternatively be deposited on the second metal substrate, or the first interlayer may be deposited on the first metal substrate and the second interlayer may be deposited in the second metal substrate.

In the following embodiments of the present description, an interlayered structure for joining titanium-based components with iron-based components includes: a first metal substrate comprising titanium; a second metal substrate comprising iron; a first interlayer disposed between the first metal substrate and the second metal substrate, the first interlayer comprising at least one of molybdenum and vanadium; a second interlayer disposed between the first interlayer and the second metal substrate, the second interlayer comprising at least one of chromium and nickel; and a third interlayer disposed between the second interlayer and the second metal substrate, the third interlayer comprising iron.

In an aspect, the first metal substrate comprises a titanium-based alloy. In another aspect, the second metal substrate comprises an iron-based alloy, such as steel, in particular stainless steel.

In an aspect, the first interlayer comprises molybdenum. For example, the first interlayer consists of molybdenum and up to 5% of other elements.

In another aspect, the first interlayer comprises vanadium. For example, the first interlayer consists of vanadium and up to 5% of other elements.

In yet another aspect, the first interlayer comprises molybdenum and vanadium. For example, the first interlayer consists of molybdenum, vanadium and up to 5% of other elements.

In an aspect, the second interlayer comprises chromium. For example, the second interlayer consists of chromium and up to 5% of other elements.

In another aspect, the second interlayer comprises nickel. For example, the second interlayer consists of nickel and up to 5% of other elements.

In yet another aspect, the second interlayer comprises chromium and nickel. For example, the second interlayer consists of chromium, nickel and up to 5% of other elements.

In an aspect, the third interlayer consists of nickel and up to 5% of other elements.

In an aspect, the first interlayer has a thickness of at least 0.001 inch, such as at least 0.01 inch. In another aspect, the second interlayer has a thickness of at least 0.001 inch, such as at least 0.01 inch. In yet another aspect, the third interlayer may have a thickness of at least 0.001 inch.

In an aspect, first interlayer, the second interlayer, and the third interlayer may be deposited on the first metal substrate. The first interlayer may be deposited directly on the first metal substrate, the second interlayer may be deposited directly on the first interlayer, and the third interlayer may be deposited directly on the second interlayer.

In another aspect, the first interlayer, the second interlayer, and the third interlayer may be deposited on the second metal substrate. The third interlayer may be deposited directly on the first metal substrate, the second interlayer may be deposited directly on the third interlayer, and the first interlayer may be deposited directly on the second interlayer.

Figure 10:
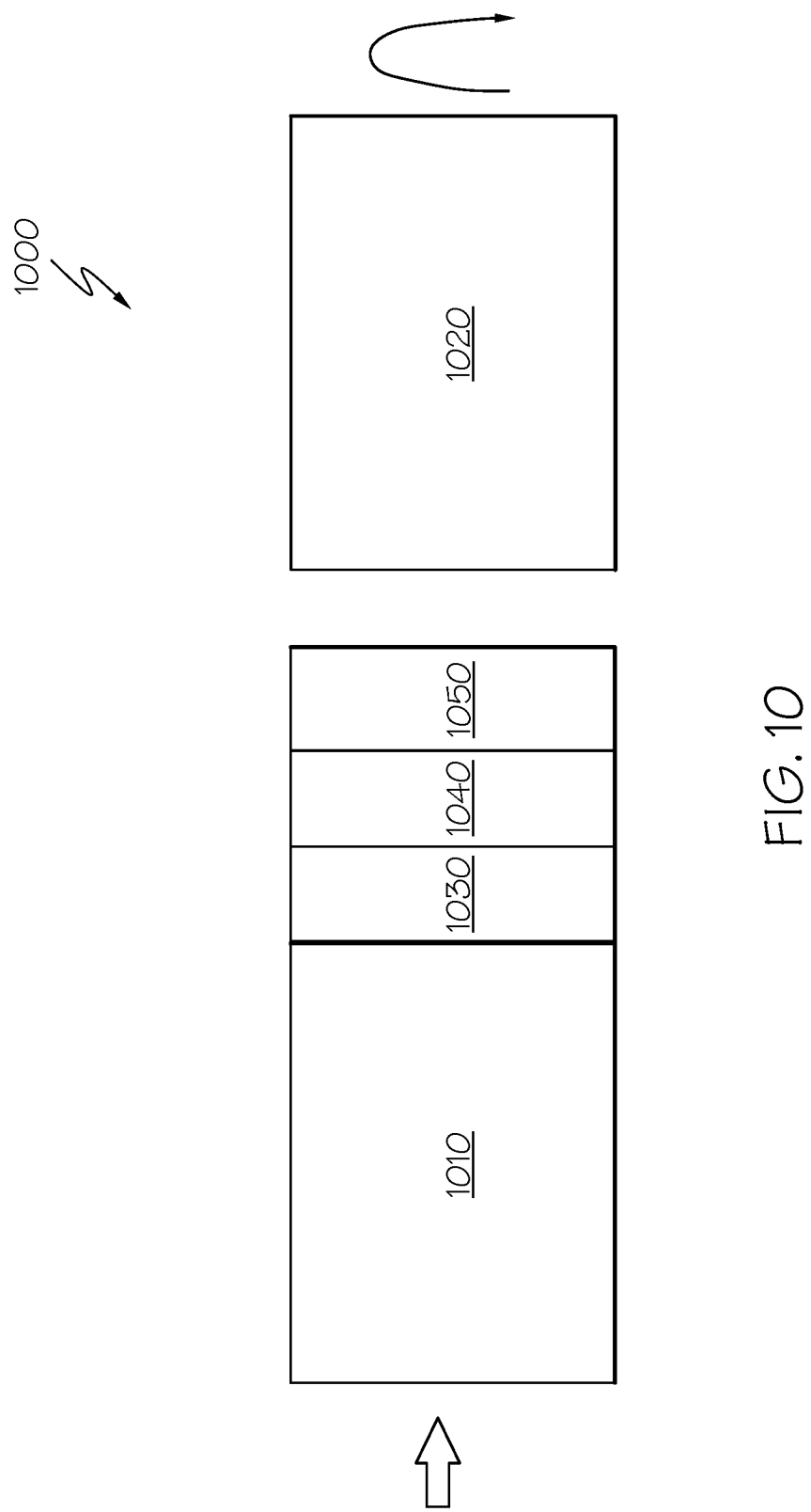
FIG. 10 is a side view of yet another exemplary interlayered structure for joining titanium-based components with iron-based components according to an embodiment of the present description.

FIG. 10 illustrates an exemplary interlayered structure 1000 for joining titanium-based components with iron-based components. The interlayered structure 1000 includes: a first metal substrate 1010 comprising a titanium-based alloy; a second metal substrate 1020 comprising an iron-based alloy; a first interlayer 1030 disposed between the first metal substrate and the second metal substrate, the first interlayer comprising molybdenum; a second interlayer 1040 disposed between the first interlayer and the second metal substrate, the second interlayer comprising chromium; and a third interlayer 1050 comprising iron, the third interlayer disposed between the second interlayer and the second metal substrate. By way of selecting the first interlayer to comprise molybdenum, the second interlayer to comprise chromium, and the third interlayer to comprise iron, the formation of deleterious phases at the interface between the first metal substrate and the second metal substrate can be prevented or minimized. In this exemplary embodiment, the first interlayer comprises molybdenum and is deposited directly on the titanium of the first metal substrate, the second interlayer comprises chromium and is deposited directly on the first interlayer that comprises molybdenum, and the third interlayer comprises iron and is deposited on the second interlayer that comprises chromium. The first interlayer has a selected composition comprising molybdenum, which has a maximum solid solubility within the first material substrate comprising the titanium-based alloy that is greater than or equal to the solubility of the other interlayers (comprising chromium and iron) within the first material substrate comprising the titanium-based alloy. Likewise, the third interlayer (or last interlayer) has a selected composition comprising iron, which has a maximum solid solubility within the composition of the second material substrate comprising the iron-based alloy that is greater than or equal to the solubility of the other interlayers (comprising molybdenum and chromium) within the second material substrate comprising the iron-based alloy. Although the first interlayer, the second interlayer, and the third interlayer are shown as being deposited on the first metal substrate, the first interlayer, the second interlayer, and the third interlayer may alternatively be deposited on the second metal substrate, or the interlayers may be deposited on both the first metal substrate and the second metal substrate in various permutations.

Figure 11:
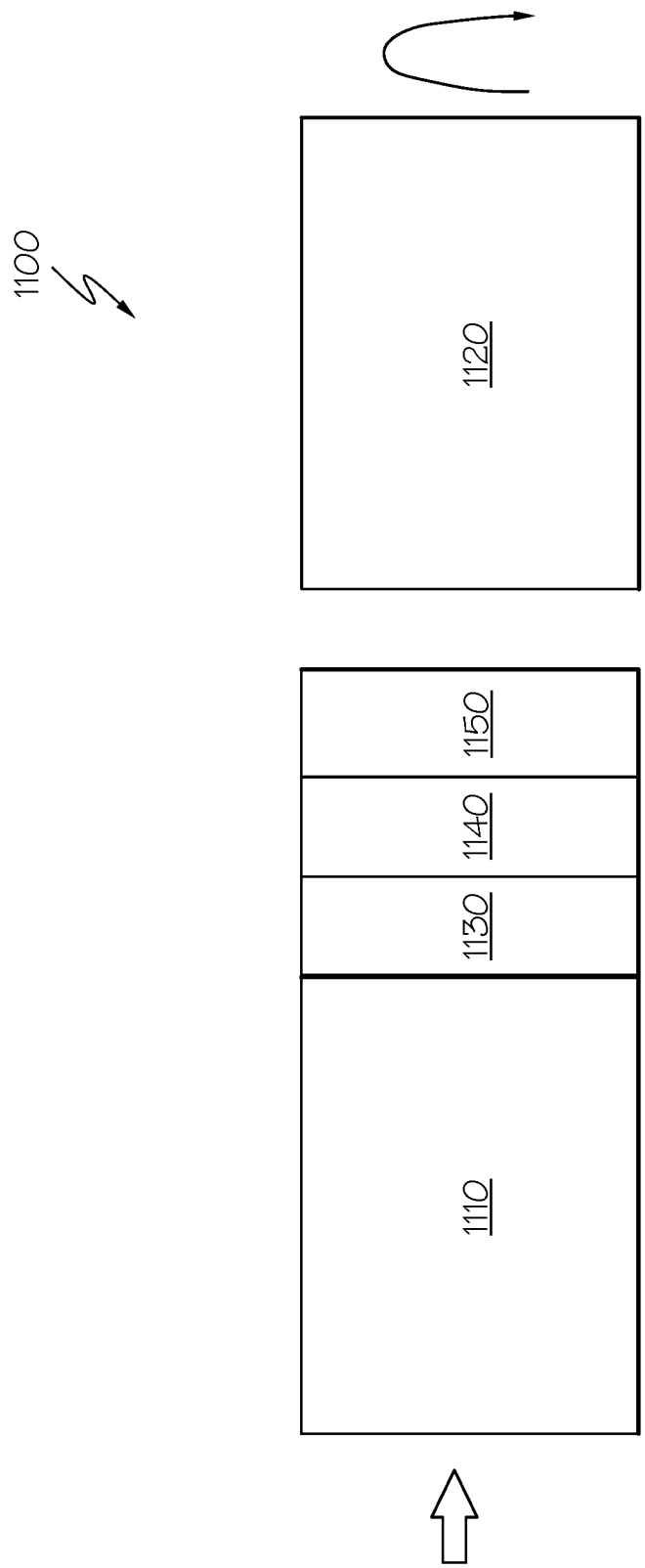
FIG. 11 is a side view of yet another exemplary interlayered structure for joining titanium-based components with iron-based components according to an embodiment of the present description.

FIG. 11 illustrates an exemplary interlayered structure 1100 for joining titanium-based components with iron-based components. The interlayered structure 1100 includes: a first metal substrate 1110 comprising a titanium-based alloy; a second metal substrate 1120 comprising an iron-based alloy; a first interlayer 1130 disposed between the first metal substrate and the second metal substrate, the first interlayer comprising molybdenum; a second interlayer 1140 disposed between the first interlayer and the second metal substrate, the second interlayer comprising nickel; and a third interlayer 1150 comprising iron, the third interlayer disposed between the second interlayer and the second metal substrate. By way of selecting the first interlayer to comprise molybdenum, the second interlayer to comprise nickel, and the third interlayer to comprise iron, the formation of deleterious phases at the interface between the first metal substrate and the second metal substrate can be prevented or minimized. In this exemplary embodiment, the first interlayer comprises molybdenum and is deposited directly on the titanium of the first metal substrate, the second interlayer comprises nickel and is deposited directly on the first interlayer that comprises molybdenum, and the third interlayer comprises iron and is deposited on the second interlayer that comprises nickel. The first interlayer has a selected composition comprising molybdenum, which has a maximum solid solubility within the first material substrate comprising the titanium-based alloy that is greater than or equal to the solubility of the other interlayers (comprising nickel and iron) within the first material substrate comprising the titanium-based alloy. Likewise, the third interlayer (or last interlayer) has a selected composition comprising iron, which has a maximum solid solubility within the composition of the second material substrate comprising the iron-based alloy that is greater than or equal to the solubility of the other interlayers (comprising molybdenum and nickel) within the second material substrate comprising the iron-based alloy. Although the first interlayer, the second interlayer, and the third interlayer are shown as being deposited on the first metal substrate, the first interlayer, the second interlayer, and the third interlayer may alternatively be deposited on the second metal substrate, or the interlayers may be deposited on both the first metal substrate and the second metal substrate in various permutations.

Figure 12:
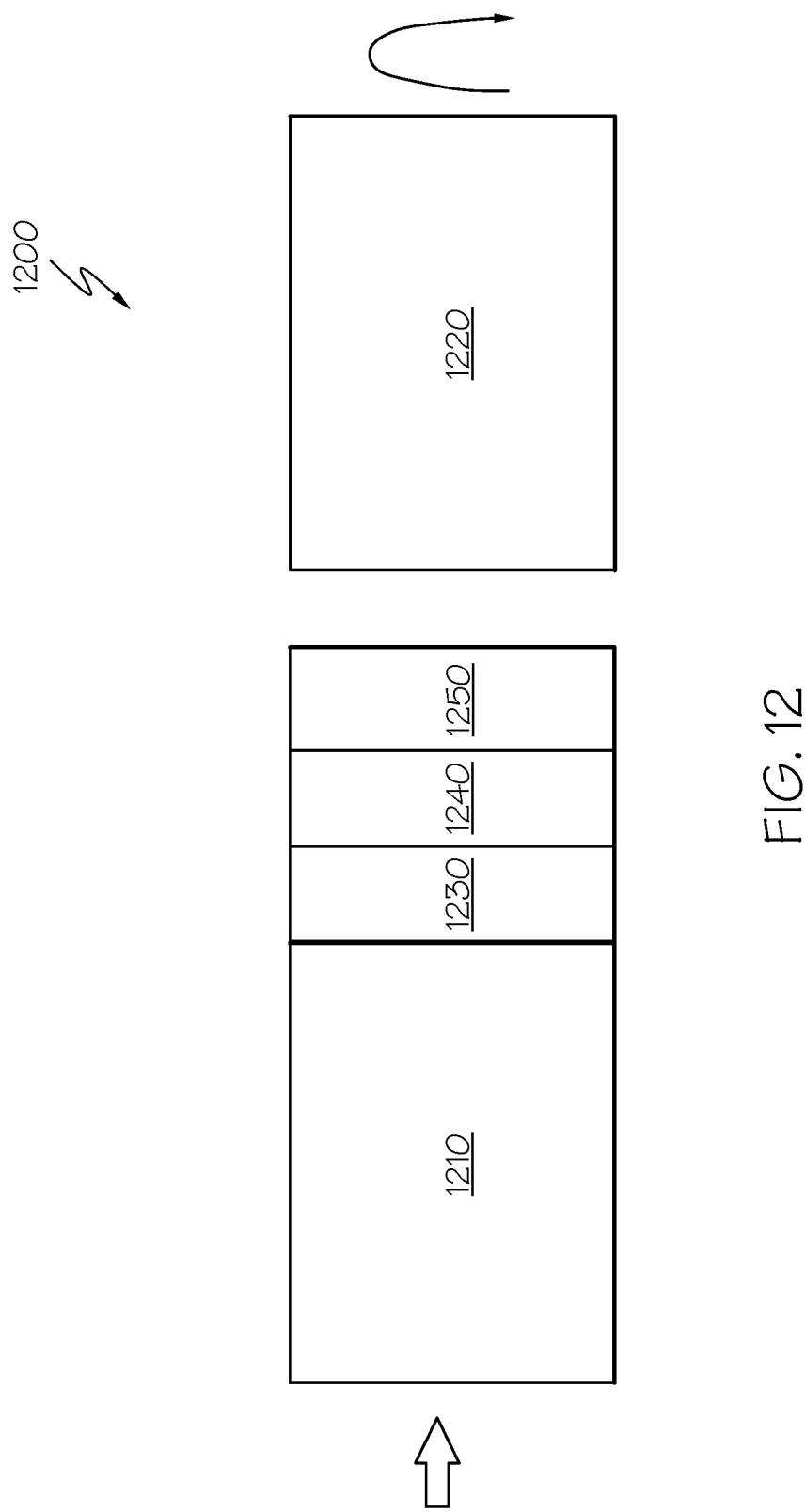
FIG. 12 is a side view of yet another exemplary interlayered structure for joining titanium-based components with iron-based components according to an embodiment of the present description.

FIG. 12 illustrates an exemplary interlayered structure 1200 for joining titanium-based components with iron-based components. The interlayered structure 1200 includes: a first metal substrate 1210 comprising a titanium-based alloy; a second metal substrate 1220 comprising an iron-based alloy; a first interlayer 1230 disposed between the first metal substrate and the second metal substrate, the first interlayer comprising vanadium; a second interlayer 1240 disposed between the first interlayer and the second metal substrate, the second interlayer comprising chromium; and a third interlayer 1250 comprising iron, the third interlayer disposed between the second interlayer and the second metal substrate. By way of selecting the first interlayer to comprise vanadium, the second interlayer to comprise chromium, and the third interlayer to comprise iron, the formation of deleterious phases at the interface between the first metal substrate and the second metal substrate can be prevented or minimized. In this exemplary embodiment, the first interlayer comprises vanadium and is deposited directly on the titanium of the first metal substrate, the second interlayer comprises chromium and is deposited directly on the first interlayer that comprises vanadium, and the third interlayer comprises iron and is deposited on the second interlayer that comprises chromium. The first interlayer has a selected composition comprising vanadium, which has a maximum solid solubility within the first material substrate comprising the titanium-based alloy that is greater than or equal to the solubility of the other interlayers (comprising chromium and iron) within the first material substrate comprising the titanium-based alloy. Likewise, the third interlayer (or last interlayer) has a selected composition comprising iron, which has a maximum solid solubility within the composition of the second material substrate comprising the iron-based alloy that is greater than or equal to the solubility of the other interlayers (comprising vanadium and chromium) within the second material substrate comprising the iron-based alloy. Although the first interlayer, the second interlayer, and the third interlayer are shown as being deposited on the first metal substrate, the first interlayer, the second interlayer, and the third interlayer may alternatively be deposited on the second metal substrate, or the interlayers may be deposited on both the first metal substrate and the second metal substrate in various permutations.

Figure 13:
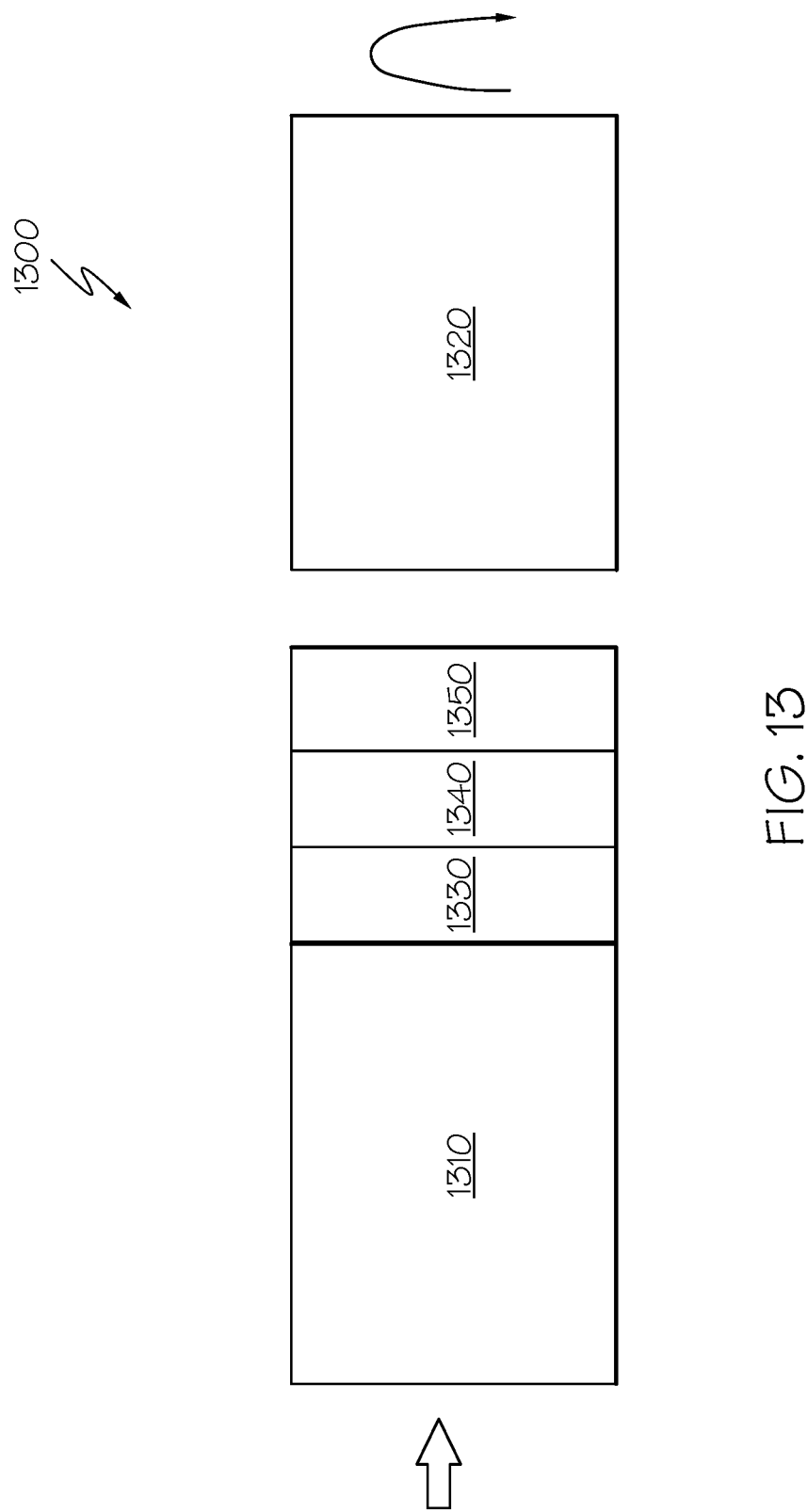
FIG. 13 is a side view of yet another exemplary interlayered structure for joining titanium-based components with iron-based components according to an embodiment of the present description.

FIG. 13 illustrates an exemplary interlayered structure 1300 for joining titanium-based components with iron-based components. The interlayered structure 1300 includes: a first metal substrate 1310 comprising a titanium-based alloy; a second metal substrate 1320 comprising an iron-based alloy; a first interlayer 1330 disposed between the first metal substrate and the second metal substrate, the first interlayer comprising vanadium; a second interlayer 1340 disposed between the first interlayer and the second metal substrate, the second interlayer comprising nickel; and a third interlayer 1350 comprising iron, the third interlayer disposed between the second interlayer and the second metal substrate. In this exemplary embodiment, the first interlayer comprises vanadium and is deposited directly on the titanium of the first metal substrate, the second interlayer comprises nickel and is deposited directly on the first interlayer that comprises vanadium, and the third interlayer comprises iron and is deposited on the second interlayer that comprises nickel. The first interlayer has a selected composition comprising vanadium, which has a maximum solid solubility within the first material substrate comprising the titanium-based alloy that is greater than or equal to the solubility of the other interlayers (comprising nickel and iron) within the first material substrate comprising the titanium-based alloy. Likewise, the third interlayer (or last interlayer) has a selected composition comprising iron, which has a maximum solid solubility within the composition of the second material substrate comprising the iron-based alloy that is greater than or equal to the solubility of the other interlayers (comprising vanadium and nickel) within the second material substrate comprising the iron-based alloy. By way of selecting the first interlayer to comprise vanadium, the second interlayer to comprise nickel, and the third interlayer to comprise iron, the formation of deleterious phases at the interface between the first metal substrate and the second metal substrate can be prevented or minimized. Although the first interlayer, the second interlayer, and the third interlayer are shown as being deposited on the first metal substrate, the first interlayer, the second interlayer, and the third interlayer may alternatively be deposited on the second metal substrate, or the interlayers may be deposited on both the first metal substrate and the second metal substrate in various permutations.

Figure 14:
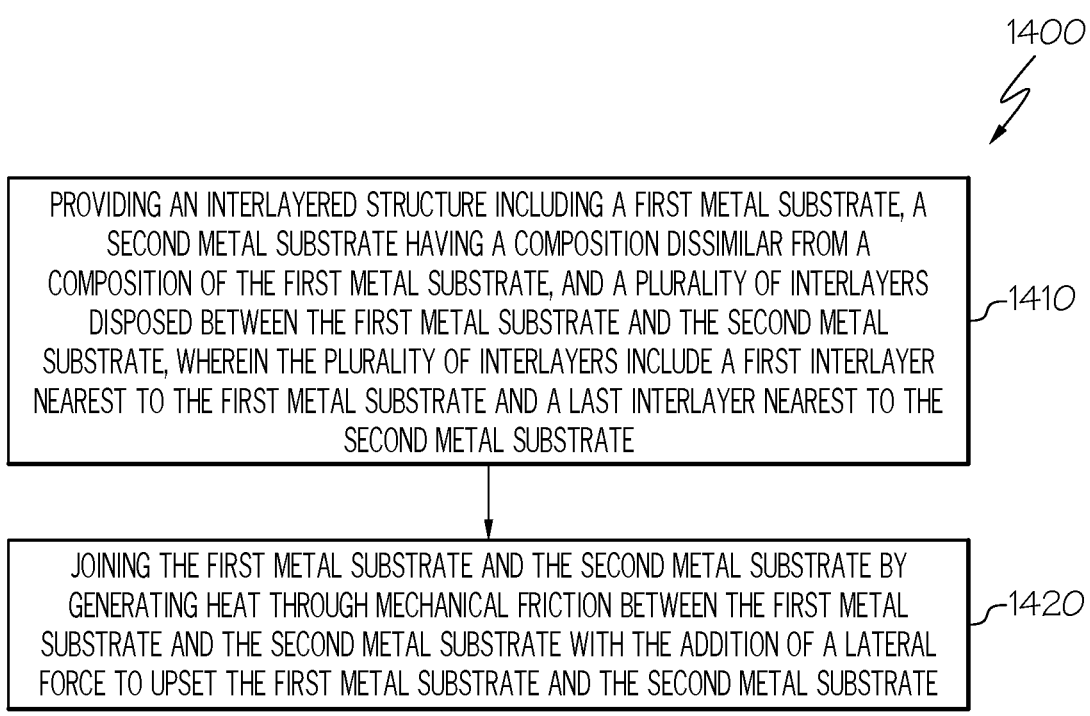
FIG. 14 is a side view of yet another exemplary interlayered structure for joining titanium-based components with iron-based components according to an embodiment of the present description.

FIG. 14 represents a method for joining dissimilar metals 1400 including, at block 1410, providing an interlayered structure including a first metal substrate, a second metal substrate having a composition dissimilar from a composition of the first metal substrate, and a plurality of interlayers disposed between the first metal substrate and the second metal substrate, wherein the plurality of interlayers include a first interlayer nearest to the first metal substrate and a last interlayer nearest to the second metal substrate, and, at block 1420, joining the first metal substrate and a second metal substrate by generating heat through mechanical friction between the first metal substrate and the second metal substrate with the addition of a lateral force to upset the first metal substrate and the second metal substrate.

The step of providing an interlayered structure at block 1410 may include providing any of the interlayered structures as previously described above.

The step of joining the first metal substrate and the second metal substrate at block 1420 may include joining by at least one of linear friction welding and inertia friction welding.

In the joining step, a sacrificial portion of the plurality of interlayers may be consumed during the joining step.

The joining step may yield an intermixed interlayer having a thickness of at least 0.0001 inch between the first material substrate and the second material substrate.

Figure 15:
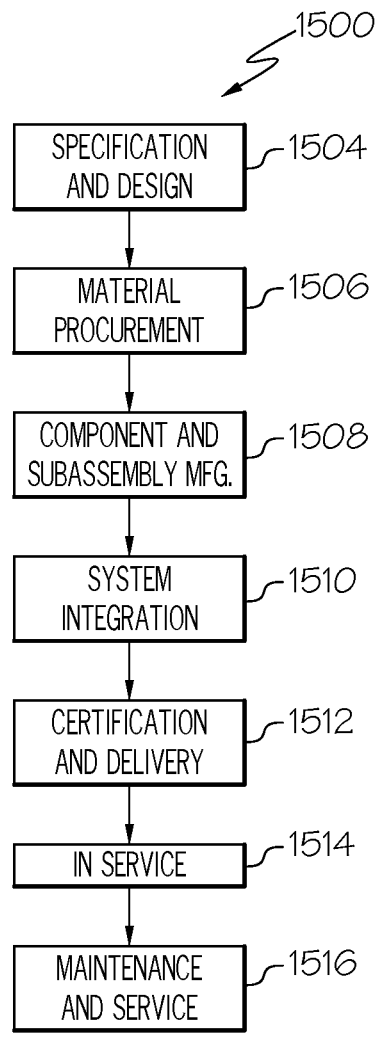
FIG. 15 is flow diagram of an aircraft manufacturing and service methodology.
Figure 16:
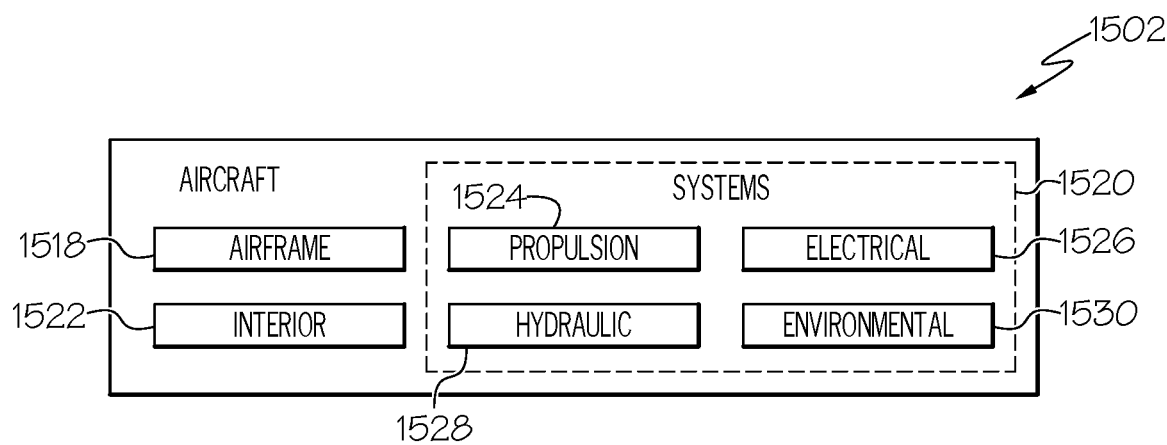
FIG. 16 is a block diagram of an aircraft.

Examples of the present description may be described in the context of an aircraft manufacturing and service method 1500, as shown in FIG. 15, and an aircraft 1502, as shown in FIG. 16. During pre-production, the aircraft manufacturing and service method 1500 may include specification and design 1504 of the aircraft 1502 and material procurement 1506. During production, component/subassembly manufacturing 1508 and system integration 1510 of the aircraft 1502 takes place. Thereafter, the aircraft 1502 may go through certification and delivery 1512 in order to be placed in service 1514. While in service by a customer, the aircraft 1502 is scheduled for routine maintenance and service 1516, which may also include modification, reconfiguration, refurbishment and the like.

Each of the processes of aircraft manufacturing and service method 1500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

The disclosed interlayered structures for joining dissimilar materials and methods for joining dissimilar metals may be employed during any one or more of the stages of the aircraft manufacturing and service method 1500.

As shown in FIG. 16, the aircraft 1502 produced by aircraft manufacturing and service method 1500 may include an airframe 1518 with a plurality of systems 1520 and an interior 1522. Examples of the plurality of systems 1520 may include one or more of a propulsion system 1524, an electrical system 1526, a hydraulic system 1528, and an environmental system 1530. Any number of other systems may be included. The disclosed interlayered structures for joining dissimilar materials and methods for joining dissimilar metals may be employed for any of the systems of the aircraft 1502.

The interlayered structures for joining dissimilar materials and methods for joining dissimilar metals are described in the context of an aircraft; however, one of ordinary skill in the art will readily recognize that the disclosed interlayered structures for joining dissimilar materials and methods for joining dissimilar metals may be utilized for a variety of vehicles and non-vehicles.

The following are provided in accordance with various aspects and embodiments of the present disclosure:

A1. An interlayered structure for joining of dissimilar materials, comprising: a first material substrate; a second material substrate having a composition dissimilar from a composition of the first material substrate; and a plurality of interlayers disposed between the first material substrate and the second material substrate, including a first interlayer nearest to the first material substrate and a last interlayer nearest to the second material substrate, wherein the first interlayer has a composition selected to have a maximum solid solubility within the composition of the first material substrate that is greater than or equal to the other interlayers' solubility within the composition of the first material substrate, and wherein the last interlayer has a composition selected to have a maximum solid solubility within the composition of the second material substrate that is greater than or equal to the other interlayers' solubility within the composition of the second material substrate.

A2. The interlayered structure of A1 wherein the first interlayer has a composition selected to have a maximum solid solubility within the composition of the first material substrate that is greater than the last interlayer within the composition of the first material substrate, and wherein the last interlayer has a composition selected to have a maximum solid solubility within the composition of the second material substrate that is greater than the first interlayer within the composition of the second material substrate.

A3. The interlayered structure of any one of A1 to A2 wherein the plurality of interlayers includes a second interlayer between the first interlayer and the last interlayer, wherein the second interlayer has a composition selected to have a maximum solid solubility within the composition of the first material substrate that is greater than the last interlayer within the composition of the first material substrate and to have a maximum solid solubility within the composition of the second material substrate that is greater than the first interlayer within the composition of the second material substrate.

A4. The interlayered structure of any one of A1 to A3 wherein the plurality of interlayers are deposited on at least one of the first material substrate and the second material substrate.

A5. The interlayered structure of any one of A1 to A4 wherein the plurality of interlayers each have a thickness of at least 0.001 inch.

A6. The interlayered structure of any one of A1 to A5 wherein the plurality of interlayers include two or more elemental layers that respectively comprise one of chromium, nickel, vanadium, molybdenum, iron, and combinations thereof.

B1. An interlayered structure for joining of titanium-based components with iron-based components, comprising: a first metal substrate comprising titanium; a second metal substrate comprising iron; a first interlayer disposed between the first metal substrate and the second metal substrate, the first interlayer comprising at least one of molybdenum and vanadium; and a second interlayer disposed between the first interlayer and the second metal substrate, the second interlayer comprising at least one of chromium and nickel.

B2. The interlayered structure of B1 wherein the first metal substrate comprises a titanium-based alloy.

B3. The interlayered structure of any one of B1 to B2 wherein the second metal substrate comprises an iron-based alloy.

B4. The interlayered structure of B3 wherein the second metal substrate comprises steel.

B5. The interlayered structure of any one of B1 to B4 wherein the first interlayer comprises molybdenum.

B6. The interlayered structure of B5 wherein the first interlayer consists of molybdenum and up to 5% of other elements.

B7. The interlayered structure of any one of B1 to B4 wherein the first interlayer comprises vanadium.

B8. The interlayered structure of B7 wherein the first interlayer consists of vanadium and up to 5% of other elements.

B9. The interlayered structure of any one of B1 to B4 wherein the first interlayer comprises molybdenum and vanadium.

B10. The interlayered structure of B9 wherein the first interlayer consists of molybdenum, vanadium and up to 5% of other elements.

B11. The interlayered structure of any one of B1 to B10 wherein the second interlayer comprises chromium.

B12. The interlayered structure of B11 wherein the second interlayer consists of chromium and up to 5% of other elements.

B13. The interlayered structure of any one of B1 to B10 wherein the second interlayer comprises nickel.

B14. The interlayered structure of B13 wherein the second interlayer consists of nickel and up to 5% of other elements.

B15. The interlayered structure of any one of B1 to B10 wherein the second interlayer comprises chromium and nickel.

B16. The interlayered structure of B15 wherein the second interlayer consists of chromium, nickel and up to 5% of other elements.

B17. The interlayered structure of any one of B1 to B16 wherein the first interlayer has a thickness of at least 0.001 inch.

B18. The interlayered structure of any one of B1 to B17 wherein the second interlayer has a thickness of at least 0.001 inch.

B19. The interlayered structure of any one of B1 to B18 wherein the first interlayer and the second interlayer are deposited on the first metal substrate.

B20. The interlayered structure of B19 wherein the first interlayer is deposited directly on the first metal substrate.

B21. The interlayered structure of any one of B19 to B20 wherein the second interlayer is deposited directly on the first interlayer.

B22. The interlayered structure of any one of B1 to B18 wherein the first interlayer and the second interlayer are deposited on the second metal substrate.

B23. The interlayered structure of B22 wherein the second interlayer is deposited directly on the second metal substrate.

B24. The interlayered structure of any one of B22 to B23 wherein the first interlayer is deposited directly on the second interlayer.

B25. The interlayered structure of any one of B1 to B18 further comprising a third interlayer disposed between the second interlayer and the second metal substrate, the third interlayer comprising iron.

B26. The interlayered structure of B25 wherein the third interlayer consists of iron and up to 5% of other elements.

B27. The interlayered structure of any one of B25 to B26 wherein the third interlayer has a thickness of at least 0.001 inch.

B28. The interlayered structure of any one of B25 to B27 wherein the first interlayer, the second interlayer, and the third interlayer are deposited on the first metal substrate.

B29. The interlayered structure of B28 wherein the first interlayer is deposited directly on the first metal substrate.

B30. The interlayered structure of any one of B28 to B29 wherein the second interlayer is deposited directly on the first interlayer.

B31. The interlayered structure of any one of B28 to B30 wherein the third interlayer is deposited directly on the second interlayer.

B32. The interlayered structure of any one of B25 to B27 wherein the first interlayer, the second interlayer, and the third interlayer are deposited on the second metal substrate.

B33. The interlayered structure of B32 wherein the third interlayer is deposited directly on the first metal substrate.

B34. The interlayered structure of any one of B32 to B33 wherein the second interlayer is deposited directly on the third interlayer.

B35. The interlayered structure of any one of B32 to B34 wherein the first interlayer is deposited directly on the second interlayer.

B36. The interlayered structure of B1 wherein the first metal substrate comprises a titanium-based alloy and the second metal substrate comprises an iron-based alloy.

B37. The interlayered structure of B36 wherein the first interlayer comprises vanadium, and the second interlayer comprises chromium.

B38. The interlayered structure of B37 further comprising a third interlayer disposed between the second interlayer and the second metal substrate, the third interlayer comprising iron.

B39. The interlayered structure of B38 wherein the third interlayer comprising iron is deposited directly on the steel of the second metal substrate, the second interlayer comprising chromium is deposited directly on the third interlayer comprising iron, and the first interlayer comprises vanadium is deposited directly on the second interlayer that comprises chromium.

B40. The interlayered structure of B36 wherein the first interlayer comprises vanadium and is deposited directly on the titanium of the first metal substrate.

B41. The interlayered structure of B40 wherein the second interlayer comprises chromium and is deposited directly on the first interlayer that comprises vanadium.

B42. The interlayered structure of B41, further comprising a third interlayer deposited directly on the second interlayer that comprises chromium, the third interlayer comprising iron.

C1. A method for joining dissimilar metals, comprising: providing an interlayered structure, comprising: a first metal substrate; a second metal substrate having a composition dissimilar from a composition of the first metal substrate; and a plurality of interlayers disposed between the first metal substrate and the second metal substrate, including a first interlayer nearest to the first metal substrate and a last interlayer nearest to the second metal substrate, wherein the first interlayer has a composition selected to have a maximum solid solubility within the composition of the first material substrate that is greater than or equal to the other interlayers within the composition of the first material substrate, and wherein the last interlayer has a composition selected to have a maximum solid solubility within the composition of the second material substrate that is greater than or equal to the other interlayers within the composition of the second material substrate; and joining the first metal substrate and a second metal substrate by heat of friction derived from relative movement between the first metal substrate and the second metal substrate.

C2. The method of C1 wherein the joining includes at least one of linear friction welding and inertia friction welding.

C3. The method of any one of C1 to C2 further comprising consuming a sacrificial portion of the plurality of interlayers during the joining step.

C4. The method of any one of C1 to C3, wherein the joining step yields an intermixed layer having a thickness of at least 0.0001 inches between the first material substrate and the second material substrate.

Although various embodiments of the disclosed interlayered structures for joining dissimilar materials and methods for joining dissimilar metals have been shown and described, modifications may occur to those skilled in the art upon reading the specification. The present application includes such modifications and is limited only by the scope of the claims.

What is claimed is:

1. An interlayered structure for joining of dissimilar materials through friction welding derived from relative movement between the dissimilar materials, comprising:
a first material substrate;
a second material substrate having a composition dissimilar from a composition of the first material substrate; and
a plurality of interlayers disposed between the first material substrate and the second material substrate, including a first interlayer nearest to the first material substrate and a last interlayer nearest to the second material substrate,
wherein the first interlayer has a composition selected to have a maximum solid solubility within the composition of the first material substrate that is greater than or equal to the other interlayers' solubility within the composition of the first material substrate,
wherein the last interlayer has a composition selected to have a maximum solid solubility within the composition of the second material substrate that is greater than or equal to the other interlayers' solubility within the composition of the second material substrate, and
wherein at least one of the plurality of interlayers has a thickness of at least 0.01 inch and the plurality of interlayers facilitate joining of the first material substrate and the second material substrate by friction welding.

2. The interlayered structure of claim 1 wherein the first interlayer has a composition selected to have a maximum solid solubility within the composition of the first material substrate that is greater than the last interlayer within the composition of the first material substrate, and wherein the last interlayer has a composition selected to have a maximum solid solubility within the composition of the second material substrate that is greater than the first interlayer within the composition of the second material substrate.

3. The interlayered structure of claim 1 wherein the plurality of interlayers includes a second interlayer between the first interlayer and the last interlayer, wherein the second interlayer has a composition selected to have a maximum solid solubility within the composition of the first material substrate that is greater than the last interlayer within the composition of the first material substrate and to have a maximum solid solubility within the composition of the second material substrate that is greater than the first interlayer within the composition of the second material substrate.

4. The interlayered structure of claim 1 wherein the plurality of interlayers are deposited on at least one of the first material substrate and the second material substrate.

5. The interlayered structure of claim 1 wherein the plurality of interlayers include two or more elemental layers that respectively comprise one of chromium, nickel, vanadium, molybdenum, iron, and combinations thereof.

6. An interlayered structure for joining of titanium-based components with iron-based components through friction welding derived from relative movement between the components, comprising:
a first metal substrate comprising titanium;
a second metal substrate comprising steel;
a first interlayer disposed between the first metal substrate and the second metal substrate, the first interlayer comprising at least one of molybdenum and vanadium;
a second interlayer disposed between the first interlayer and the second metal substrate, the second interlayer comprising at least one of chromium and nickel; and
a third interlayer disposed between the second interlayer and the second metal substrate, the third interlayer comprising iron,
wherein the first interlayer, the second interlayer, and the third interlayer each have a thickness of at least 0.01 inch and facilitate joining of the first metal substrate and the second metal substrate by friction welding.

7. The interlayered structure of claim 6 wherein the first metal substrate comprises a titanium-based alloy.

8. The interlayered structure of claim 6 wherein the first interlayer comprises molybdenum.

9. The interlayered structure of claim 6 wherein the first interlayer comprises vanadium.

10. The interlayered structure of claim 6 wherein the second interlayer comprises chromium.

11. The interlayered structure of claim 6 wherein the second interlayer comprises nickel.

12. The interlayered structure of claim 6 wherein the first interlayer and the second interlayer are deposited on the first metal substrate.

13. The interlayered structure of claim 7 wherein the first interlayer comprises vanadium, and the second interlayer comprises chromium.

14. A method for joining dissimilar metals through friction welding, comprising:
    providing an interlayered structure, comprising:
        a first metal substrate;
        a second metal substrate having a composition dissimilar from a composition of the first metal substrate; and
        a plurality of interlayers disposed between the first metal substrate and the second metal substrate, including a first interlayer nearest to the first metal substrate and a last interlayer nearest to the second metal substrate, wherein the first interlayer has a composition selected to have a maximum solid solubility within the composition of the first material substrate that is greater than or equal to the other interlayers within the composition of the first material substrate, and wherein the last interlayer has a composition selected to have a maximum solid solubility within the composition of the second material substrate that is greater than or equal to the other interlayers within the composition of the second material substrate;
    depositing the first interlayer and last interlayer on the first metal substrate, wherein the plurality of interlayers each have a thickness of at least 0.01 inch that is sufficient to enable joining of the first metal substrate and second metal substrate by friction welding; and
    joining the first metal substrate and a second metal substrate by heat of friction derived from relative movement between the first metal substrate and the second metal substrate.

15. The method of claim 14 wherein the joining includes at least one of linear friction welding and inertia friction welding.

16. The interlayered structure of claim 13 wherein the third interlayer comprising iron is deposited directly on the steel of the second metal substrate, the second interlayer comprising chromium is deposited directly on the third interlayer comprising iron, and the first interlayer comprising vanadium is deposited directly on the second interlayer that comprises chromium.

17. The interlayered structure of claim 7 wherein the first interlayer comprises vanadium and is deposited directly on the titanium-based alloy of the first metal substrate.

18. The interlayered structure of claim 17 wherein the second interlayer comprises chromium and is deposited directly on the first interlayer that comprises vanadium.

19. The interlayered structure of claim 18, wherein the third interlayer is deposited directly on the second interlayer that comprises chromium.

20. The interlayered structure of claim 6 wherein the second metal substrate comprises stainless steel.

21. The interlayered structure of claim 20 wherein the third interlayer comprising iron is deposited directly on the stainless steel of the second metal substrate.

22. The interlayered structure of claim 21 wherein the second interlayer comprising chromium is deposited directly on the third interlayer comprising iron.

23. The interlayered structure of claim 22 wherein the first interlayer comprising vanadium is deposited directly on the second interlayer that comprises chromium.

24. The interlayered structure of claim 6 wherein the first interlayer has a thickness of at least 0.001 inch.

25. The interlayered structure of claim 1 wherein the plurality of interlayers each have a thickness of at least 0.01 inch.

* * * * *